Dec. 2, 1969          L. A. COOK          3,481,647
DUMP VEHICLE WITH FLUID-SLIDE UNLOADING SYSTEM
Filed May 23, 1968          3 Sheets-Sheet 1
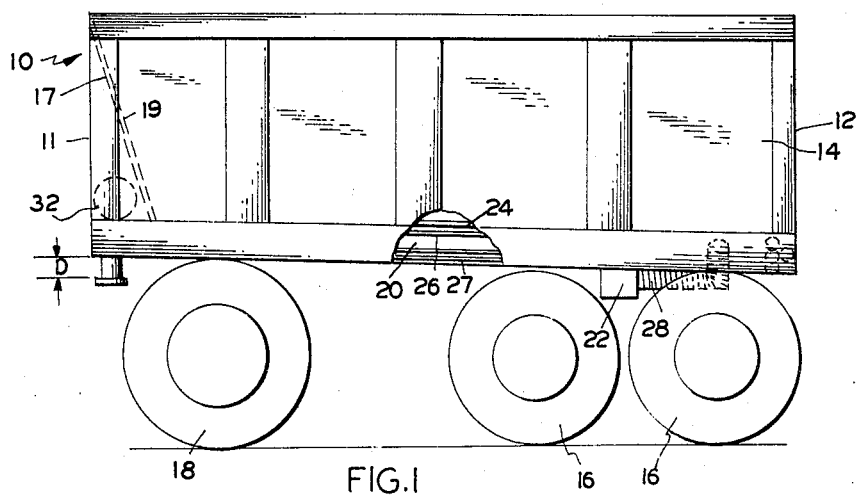
FIG.1
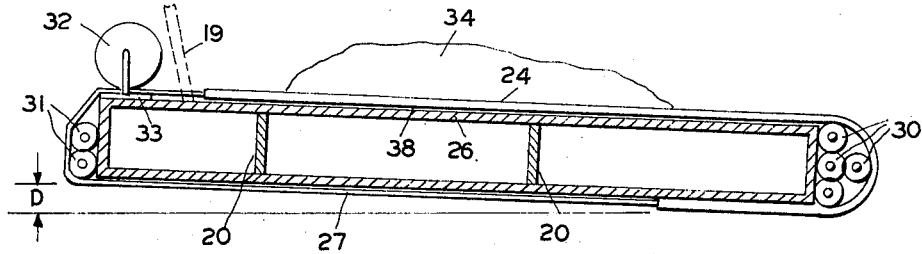
FIG.3
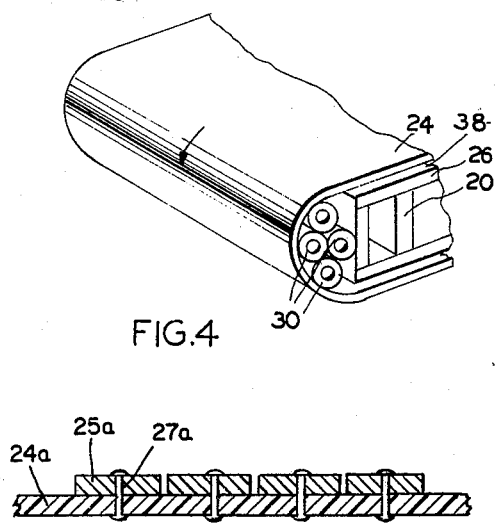
FIG.4
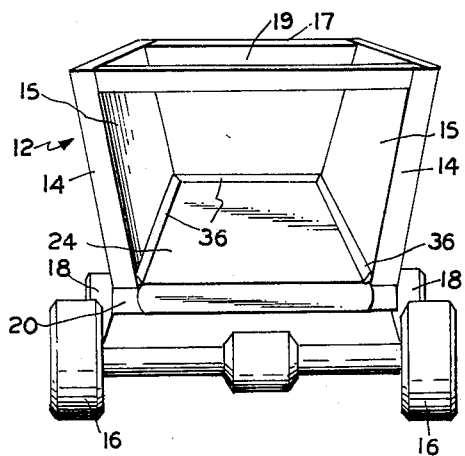
FIG.2
FIG. 4a Dec. 2, 1969  L. A. COOK  3,481,647
DUMP VEHICLE WITH FLUID-SLIDE UNLOADING SYSTEM
Filed May 23, 1968  3 Sheets-Sheet 2
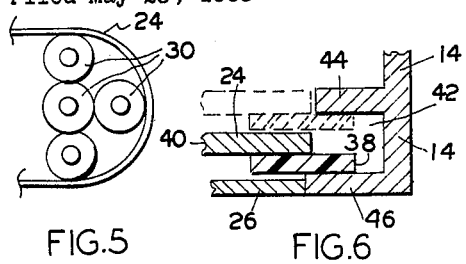
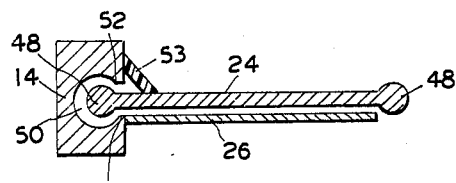
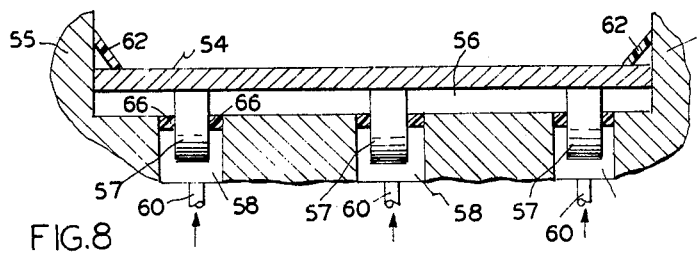
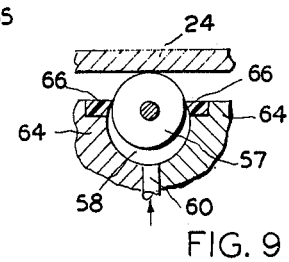
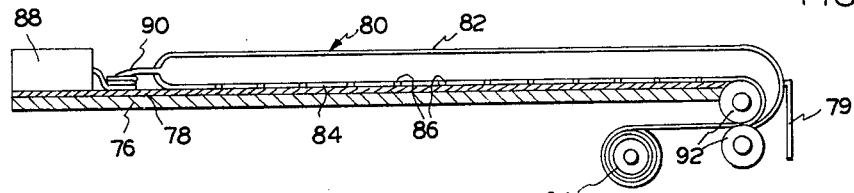
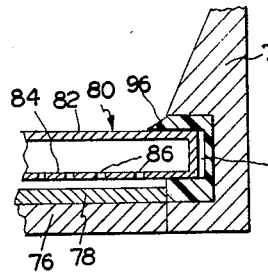
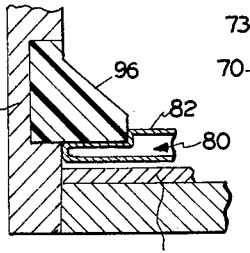
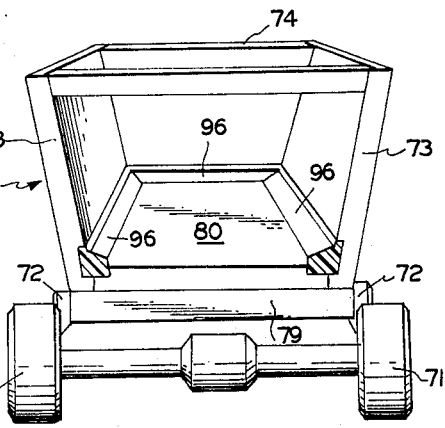
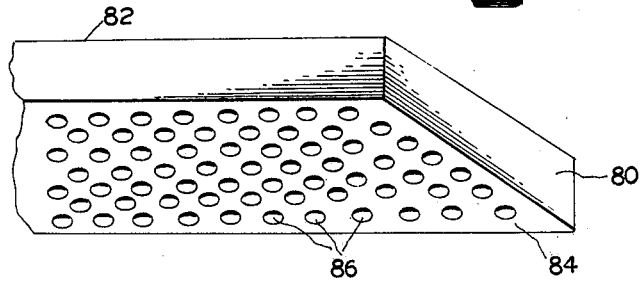

Dec. 2, 1969  L. A. COOK  3,481,647

DUMP VEHICLE WITH FLUID-SLIDE UNLOADING SYSTEM

Filed May 23, 1968  3 Sheets-Sheet 3

United States Patent Office 3,481,647
Patented Dec. 2, 1969

3,481,647
DUMP VEHICLE WITH FLUID-SLIDE UNLOADING SYSTEM
Lloyd A. Cook, P.O. Box 1385,
Parkersburg, W. Va. 26101
Continuation-in-part of application Ser. No. 484,174, Sept. 1, 1965. This application May 23, 1968, Ser. No. 740,800
Int. Cl. B60p 1/00; B61d 7/00; B65g 11/00
U.S. Cl. 298—24                     19 Claims

ABSTRACT OF THE DISCLOSURE

A dump vehicle is provided with a fluid-slide unloader system. The vehicle body is constructed so that the front end is elevated above the rear end. Above the fixed body floor a movable floor is mounted so as to move to a position below the fixed floor and return after dumping. When it is desired to unload the vehicle body, fluid under pressure is forced between the fixed and movable floors whereupon gravity causes the load to ride out of the body on the movable floor.

CROSS-REFERENCE TO RELATED APPLICATION

The present application is a continuation-in-part of U.S. patent application Ser. No. 484,174, filed Sept. 1, 1965, now abandoned.

BACKGROUND OF THE INVENTION

The present invention relates to dump vehicles, and more particularly it relates to a dump vehicle with a fluid-slide unloader system. As used throughout the specification and claims, the expression dump vehicle is intended to denote dump trucks as well as dump trailers and the like.

The present methods of unloading dump vehicles are, unsatisfactory in that they require heavy hydraulic lift equipment and very heavy frames beneath the body of the vehicle. This equipment not only adds weight but increases the cost of the dump vehicle. Another undesirable characteristic of present unloading systems is that there is always a possibility of the vehicle turning over, especially when it is on somewhat uneven ground and the dump vehicle body is lifted so high in the air that the center of gravity shifts to too great an extent. In the ordinary dump vehicle the angle at which the load needs to be raised is approximately 45° before sufficient gravitational force will be applied to overcome the friction of the load sliding across the floor of the vehicle.

SUMMARY OF THE INVENTION

In order to eliminate many of these difficulties in the present methods of unloading dump vehicles, I have devised a fluid-slide unloader system for dump vehicles. In this system, the body of the vehicle itself becomes the main structural member, eliminating the need for a heavy frame. The body is preferably constructed so that the front end is elevated somewhat higher than the rear end. The relationship is desirably about one foot of elevation of the front end for every 15 feet of vehicle length. The body is provided with a heavy duty fixed floor. Above the fixed floor is provided a movable floor. A source of fluid is employed to provide fluid under pressure between the movable floor and the fixed floor. The slope of the body is sufficient that the load contained in the vehicle itself provides sufficient horizontal force to overcome existing frictional forces and the movable floor glides on a fluid cushion over the fixed floor with the load itself providing the unloading force. As the load slides off the rear of the vehicle, the movable floor moves to a position below the fixed floor and may be returned to its original position after the dumping operation. Therefore, it is an object of this invention to provide a dump vehicle with a fluid slide unloading system.

Other objects and advantages of the invention will be more readily apparent after reading the following description in conjunction with the accompanying drawings wherein:

FIGURE 1 is a side view of a vehicle body embodying the present invention;

FIGURE 2 is a rear view of the vehicle shown in FIGURE 1;

FIGURE 3 is a side sectional view of the fluid-slide unloader mechanism shown in FIGURE 1;

FIGURE 4 is a fragmentary perspective view of the rear portion of the fluid-slide unloader system shown in FIGURES 1–3;

FIGURE 4a is a fragmentary side sectional view of a further embodiment of the invention;

FIGURE 5 is an enlarged view of the roller system similar to that shown in FIGURE 4;

FIGURES 6 and 7 are detailed cross-sectional views of two possible sealing means that may be used with the present invention;

FIGURE 8 is an alternative embodiment of a fluid-slide unloading system;

FIGURE 9 is a fragmentary side sectional view of the system shown in FIGURE 8;

FIGURE 10 is a side sectional view of another embodiment of a fluid-slide unloading system;

FIGURE 11 is a rear perspective view of the fluid-slide unloading system shown in FIGURE 10 mounted in a vehicle body;

FIGURE 12 is a partial perspective view of the mat used in FIGURE 10;

FIGURE 13 shows a sealing arrangement useful in the invention as embodied in FIGURES 10 and 11;

FIGURE 14 shows another sealing arrangement useful in the embodiments of FIGURES 10 and 11;

Figure 15:
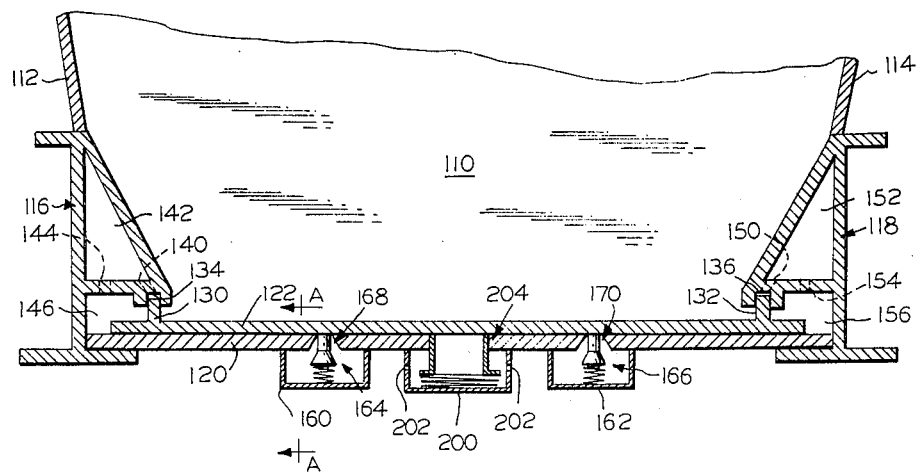
FIGURE 15 is a vertical section through a dump vehicle illustrating a further modified form of the invention.

Considered from one aspect the present invention involves a dump vehicle body having a front end and a back end which comprises:
(a) a front wall and two side walls,
(b) a bottom frame beneath said front and side walls for supporting said walls in an upright position,
(c) a fixed floor disposed on top of said bottom frame and located within the lower perimeter of said front and side walls,
(d) a movable floor disposed immediately above and parallel to said fixed floor and being at least substantially coextensive therewith,
(e) means for introducing fluid between said fixed floor and said movable floor,
(f) sealing means associated with the perimeter of said movable floor which is adapted to inhibit the escape of fluid that is introduced between said fixed floor and said movable floor, and
(g) means for allowing movement of said movable floor rearwardly on said dump vehicle body and then around and under said fixed floor.

I shall first describe the embodiment of my invention that is shown in FIGURES 1–7.

The vehicle body 10 has a front wall 17 and two side walls 14 which have inner faces 19 and 15 respectively. The front wall 17 and the side walls 14 are shown to be sloping and while this is the preferred embodiment, they may also be disposed vertically without any slope.

Beneath the front wall 17 and the side walls 14 is a bottom frame 20 which provides support to maintain the walls in an upright position and to provide overall support for the entire vehicle body 10.

Disposed on top of said bottom frame 20 is a fixed floor 26 which is located within the lower perimeter of the front and side walls 17 and 14 respectively. The fixed floor 26 lies substantially coextensive with and is fixed to the bottom frame 20. The fixed floor is made of a rigid material and is capable of providing support for any load placed in the vehicle body.

Disposed immediately above and parallel to the fixed floor 26 is a movable floor 24. The movable floor 24 is substantially coextensive with the fixed floor 26. The movable floor 24 is made of a flexible material which may be deformed around a curved surface.

As shown in FIGURE 1, means are provided for introducing fluid between the fixed floor 26 and the movable floor 24. The fluid may be for example air, and the means for introducing air may comprise an air compressor tank 22 which is provided with a pipe 28 leading from the compressor tank 22 up through the side of the vehicle body 10. The means for introducing air between the floors could be any type of apparatus for placing an air cushion between the floors. For example the air-brake system of a vehicle could be used for such a purpose. The air under pressure may also desirably be produced by a blower connected with a power takeoff mechanism connected with the driving engine of the dump vehicle or an associated tractor in the case of a dump trailer.

Associated with the perimeter of the movable floor 24 is a sealing means which is adapted to inhibit the escape of fluid which is introduced between the fixed floor 26 and the movable floor 24. The sealing means as shown in FIGURE 2 comprises a gasket 36 which presses down against the edge of the movable floor 24 to prevent fluid from escaping from between the floors 24 and 26. FIGURE 6 shows a sealing means in which a gasket 38, which prevents the escape of air from between the movable floor 24 and the fixed floor 26, is attached to the bottom side of the movable floor 24. The gasket 38 may be made of material such as rubber, nylon, Teflon, or neoprene. The gasket 38 is affixed to the bottom side 40 of the movable floor 24. The side wall 14 of the vehicle body 10 has a notch 42 disposed therein and defined by upper portion 44 and lower portion 46 of the side wall 14. As can be seen, the gasket 38 extends into the notch 42.

In operation, as fluid is pumped between the fixed floor 26 and the movable floor 24, the movable floor 24 will be raised slightly thereby raising the gasket 38 from its resting position on lower portion 46 of side wall 14. The gasket 38 will be raised by the fluid until it comes to rest against the upper portion 44 of the side wall 14. When the gasket 38 reaches this position it will be forced against the upper portion 44 and thus will prevent any leakage of fluid from between the fixed floor 26 and the movable floor 24. The position assumed by the movable floor 24 and the gasket 38 when fluid is introduced between the floors is shown in dotted form in FIGURE 6.

FIGURE 7 shows an alternative sealing means which can be used with the dump vehicle body arrangement shown in FIGURES 1 through 5. In the embodiment shown in FIGURE 7 the movable floor 24 is provided with enlarged edge sections 48 on each side of the floor 24. The side wall 14 adjacent the movable floor 24 has an opening 50 formed therein in which these enlarged edge sections can be seated. The opening 50 in side wall 14 is defined by a pair of lips 52, one lip being on top of the movable floor 24, the other being below. Affixed to the upper lip 52 above the movable floor 24 is a sealing gasket 53 which is affixed at one end adjacent the upper lip 52 and rests on its other end against the upper surface of movable floor 24. When fluid is pumped into the space between the fixed floor 26 and the movable floor 24, sections 48 will be pushed up by the fluid against upper lip 52 and will cause the sealing gasket 53 to be more firmly pressed against the upper surface of the movable floor 24. In this way, the sealing gasket 53 provides a fluid-tight seal for preventing the escape of fluid from between the fixed floor 26 and the movable floor 24.

Means are provided for allowing movement of the movable floor 24 rearwardly on the dump vehicle and then around and under the fixed floor. In the embodiment of FIGURES 1–5 it will be seen that adjacent the rear of the bottom frame 20 are four rollers 30 around which the movable floor 24 may pass. Disposed adjacent the fixed floor 26 at the front end of the bottom frame 20 is a rewind mechanism 32 having a cable 27 attached at each end of the movable floor 24 which facilitates the movement of the movable floor 24. The cable 27 passes around rollers 31 over the rewind mechanism 32 and through a hole in the front wall 17, which is not shown, to connect with the movable floor 24. The rewinding mechanism 32 is mounted on a support member 33 to allow rotation. The load represented by the mass 34 resting on the movable floor 24 in FIGURE 3 represents any load which may be in the vehicle.

FIGURE 4 is an enlarged fragmentary view of the roller arrangement by which the movable floor 24 moves around and under the frame 20 as the load is being dumped off the back of the truck.

FIGURE 5 shows a side view of the roller arrangement in which the movable floor 24 is shown passing around the four rollers 30. The four rollers 30 are of the same diameter cross-section and extend across the entire width of the movable floor 24. The rollers 30 are provided in such a manner that they provide adequate support for the movable floor 24 as it moves around the rollers. Three of the rollers can be seen as positioned one on top of another to provide support for the top and bottom portion of movable floor 24. The fourth roller is disposed adjacent the middle of the three-stacked rollers to give support to the curvature of the movable floor 24 as it moves around the rollers 30.

Considering now some of the other embodiments of the present invention, the embodiment of FIGURE 8 shows side walls 55 which are vertical rather than sloping. Along the bottom perimeter of side walls 55 is a fixed floor 56. Disposed above and parallel to fixed floor 56 is a movable floor 54 which is made of a flexible material that may be deformed around a curved surface. The movable floor 54 is supported by a plurality of rollers 57 which are mounted below the movable floor 54. Rollers 57 are spaced across the width of the fixed floor 56 and are supported in small pockets 58, the pockets having fluid pipes 60 leading thereto through which fluid is introduced. Pockets 58 have lips 64 (see FIG. 9) which define the sides of pocket 58 and which have outer edges 66 which are preferably made of Teflon. Fixed between the side walls 55 and the movable floor 54 are gaskets 62 which press firmly against the upper surface of the movable floor 54, thereby preventing any escape of fluid from the space under the movable floor 54.

In the operation of the embodiment of the dump vehicle body shown in FIGURES 1–5, a load 34, shown in FIGURE 3, is placed in the vehicle body 10. When it is desired to unload the load 34 the air pressure producing means 22 is actuated thereby introducing air through pipe 28 into a space 38 between the movabl and fixed floors 24 and 26 respectively. The sealing gasket 36 prevents any escape of the air which is introduced between the movable and fixed floors 24 and 26 or at least greatly minimizes it. When sufficient air has been introduced by the air pressure producing means into the space 38 between the movable floor 24 and the fixed floor 26, a cushion of air will exist between the floors so that the load 34 will in effect "float" above the fixed floor 26.

At this point it will be noted (FIGURE 1) that the dump vehicle body 10 has a front end 11 and a back end 12. Wheels 16 are the rear wheels of the vehicle and the front wheels, only one of which is shown, are designated 18. The front wheels 18 are somewhat larger in diameter than the rear wheels 16. The front end 11 is thereby disposed higher off the ground than the back end 12 e.g., according to the ratio of 1 foot rise in elevation for every 15 feet of body length. In FIGURES 1 and 3 this elevation is indicated by the letter D. The vehicle body 10 is thus "tilted" to the rear and consequently when the load is "floating" on the movable floor, the load will tend to move rearwardly due to the tilt. The movable floor 24 will rotate around the rollers 30 and move under the bottom frame 20 of the vehicle body 10 until all of the load 34 has dropped off the back of the vehicle body. When all of the load has been moved off the back of the vehicle body 10 the rewind mechanism 32 and cable 27 can be actuated so that the movable floor 24 will return to its original positions. Thus when sufficient air is pumped into the space 38 between the movable floor 24 and the fixed floor 26, the load will itself provide sufficient force to overcome any frictional drag which exists.

In the operation of the embodiment of FIGURES 8 and 9, when fluid is introduced into the pockets 58 the rollers 56 are forced up against the underside of the movable floor 54 thus reducing the friction and allowing the movable floor 54 to move toward the rear of the vehicle under the force of the load thereon.

Another embodiment of this invention is shown in FIGURES 10–14. FIGURE 11 shows vehicle body 70 having rear wheels 71 and front wheels 72, with front wheels 72 being slightly larger in diameter than the rear wheels. The vehicle has a front wall 74 and side walls 73. Spaced below and adjacent the side and front wall 73 and 74 is a bottom frame 76 (see FIG. 10). On top of the bottom frame 76 is a fixed floor 78. A movable floor is provided above the fixed floor 78 in the form of an air mat 80 immediately above and parallel to the bottom floor 78 said mat having a top surface 82 and a bottom surface 84. The bottom surface 84 of the air mat 80 has a plurality of spaced apart holes as provided therein. The air mat 80 lies substantially coextensive with the fixed bottom floor 78. Means for introducing air between the fixed and movable floors is provided and includes an air pressure producing means 88 connected to a hose 90 which leads into the air mat 80. The air pressure producing means 88 is preferably located near the front of the vehicle body 70. A small hole (which is not shown) can be provided in the front wall 74 so as to allow the air hose to pass through the front wall 74 from the air pressure producing means 88 to the air mat 80. Hose 90 is long enough to permit the mat to move to the rear end of the vehicle.

FIGURE 11 shows the air mat 80 lying on the fixed floor 78 of the vehicle body 70. The air mat 80 is held down on fixed floor 78 by means of a gasket 96 which is provided on the lower inner surfaces of the side walls 73 and the front wall 74. The gasket 96 presses against the upper surface 82 of the air mat 80 and prevents any air from escaping from between the air mat 80 and the fixed floor 78. The gasket 96 is embedded in the side wall 73. FIGURE 13 shows a close-up view of the relationship between the air mat 80, the side wall 73 and the gasket 96. FIGURE 14 shows an alternate embodiment of the gasket wherein the gasket 96 is mounted within an opening in side wall 73 and provides a slot 98 in which the air mat 80 protrudes. The gasket 96 presses firmly against the upper and lower surfaces 82 and 84 respectively of the air mat 80. Various other gasketing arrangements may be used and only a few of the possible embodiments have been shown and described.

To facilitate the movement of the air mat 80, a pair of pinch rollers 92 (see FIG. 10) are provided near the back end and below the fixed floor 78. Provided adjacent the pinch rollers 92 is a takeup reel 94 on which the air mat 80 may be wound as it moves toward the rear end of the fixed floor 78.

FIGURE 4a shows a further embodiment in the invention wherein the movable floor arrangement comprises a flexible floor arrangement 24a employing strips of metal 25a that may be approximately six to twelve inches in width, said strips 25a lying in a plane perpendicular to the longer side of the vehicle body and the flexible air-proof binding material 24a affixes the strips to one another. Rivets 27a positioned at approximately the mid point of each strip 25a hold the aforesaid members together and do not interfere with the strips as they pass over the end curved portions such as are shown in FIGURE 3.

In operation of the embodiment of FIGURES 10 and 11, once a load has been placed on the top surface 82 of the air mat 80, air from the air pressure producing means 88 is sent through hose 90 into the air mat 80 which slowly inflates. As the air mat 80 becomes inflated the air slowly escapes through the holes 86 in the bottom surface 84 of the air mat 80. As this air escapes it pushes against the fixed floor 78 and causes a cushion of air to be formed between the bottom surface 84 of the mat and the fixed floor 78. Once this cushion is created the air mat 80 is free to move the load towards the rear of the vehicle. As the air mat 80 moves toward the rear of the vehicle, the air escapes much faster from the holes 86 once they have passed the end of the sub-floor 78. As this air escapes the air mat 80 is sent through pinch rollers 92 which tend to completely flatten the air mat 80. As the air mat 80 passes through the pinch rollers 92 it is then wound around a takeup reel 94. As more and more of the load is dumped off the rear of the vehicle more and more of the air mat 80 becomes wound upon the takeup reel 94. Once the load has been entirely dumped the direction of the takeup reel 94 is reversed and the air mat can be returned to its normal position in covering the fixed floor 78. In lieu of providing a special means for producing compressed air to send into the air mat 80, it is possible that the compressed air system used in the brake system of the wheels could be used for the purpose of providing sufficient pressure to inflate the air mat 80.

Referring now to FIGURES 15–18 of the drawings inclusive, a modified form of the invention is illustrated. As seen particularly in FIGURE 15, which is a vertical section through a dump vehicle looking forwardly thereof, the body includes a front wall 110 and a pair of side walls 112 and 114. These side walls 112 and 114 are supported upon portions 116 and 117 respectively of the frame of the vehicle body.

A fixed floor 120 extends between and is supported by the frame portions 116 and 118. A movable floor 122 is disposed adjacent the upwardly facing surface of fixed wall 120 as seen in FIGURE 15. A pair of longitudinally extending gaskets 130 and 132 which may be formed of any suitable somewhat resilient substance as mentioned previously are movably mounted within notches 134 and 136 respectively formed in the frame portions 116 and 118.

Notch 134 is in communication with a plurality of spaced holes 140 which is in turn in communication with an elongated channel 142 of generally triangular cross-sectional configuration which is defined within the frame portion 116. A plurality of spaced holes 144 provide communication between channel 142 and a recess 146 defined between the frame portion 116, the fixed floor 120, the movable floor 122, and the gasket 130.

A plurality of spaced holes 150 provide communication between notch 136 and a longitudinally extending channel 152 of generally triangular cross-sectional configuration defined within the frame portion 118.

A plurality of spaced holes 154 provide communication between the channel 152 and a recess 156 defined between the frame portion 118, the fixed floor 120, the movable floor 122 and the gasket 132.

A pair of longitudinally extending manifolds 160 and 162 are provided beneath the fixed floor 120, manifold 160 having a plurality of longitudinally spaced valve means 164 mounted therewithin, and manifold 162 having a similar plurality of longitudinally spaced valve means 166 mounted therein. These valve means extend through suitable holes 168 and 170 provided at spaced portions of the fixed wall 120 and the valve means extend within these holes for a purpose hereinafter described.

Figure 16:
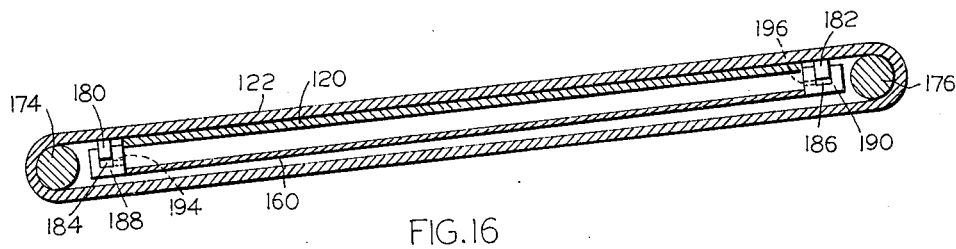
FIGURE 16 is a sectional view taken substantially along line 16—16 of FIGURE 15 looking in the direction of the arrows.

Referring now to FIGURE 16, the movable floor 122 comprises an endless belt formed of suitable flexible material which extends around a pair of rollers 174 and 176 rotatably journaled at the rear end and the forward end of the fixed floor 120 respectively.

As seen in FIGURE 16, a pair of transversely extending gaskets 180 and 182 are provided adjacent the rear and forward end edges of the fixed wall 120 and are adapted to engage an undersurface of the upper portion of the movable floor 122 to provide a seal therewith.

Gasket members 180 and 182 are mounted within slots 184 and 186 formed in supporting frame portions 188 and 190 respectively. Slot 184 is in communication with one end of manifold 180 through an opening 194, and this slot may similarly be connected in communication with the other manifold 162. In a like manner, slot 186 is in communication with the opposite end of manifold 160 through an opening 196, and may also be similarly connected in communication with the corresponding end of manifold 162. Each of manifolds 160 and 162 are connected with a suitable source of fluid under pressure.

Referring again to FIGURE 15, a further manifold 200 extends longitudinally along the undersurface of fixed floor 120 and has a plurality of spaced holes 202 on opposite sides thereof for venting this manifold to atmosphere. A plurality of longitudinally spaced valve means 204 are mounted within the manifold 202 and extend through suitable holes provided in the fixed floor 120 for a purpose hereinafter described.

Figure 17:
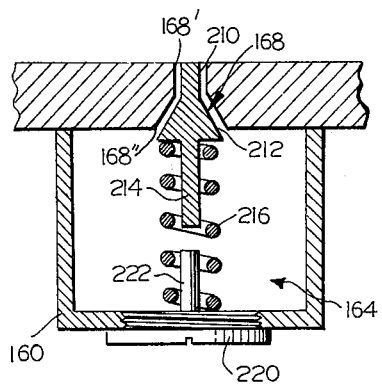
FIGURE 17 is an enlarged view of a valve mechanism illustrated in FIGURE 15.

Referring now to FIGURE 17, the details of construction of one of the valve means 164 is illustrated, it being understood that each of the valve means 164 as well as the valve means 166 are of similar construction. The hole 168 provided through fixed floor 120 includes a first generally cylindrical upper portion 168' which joins with a downwardly flaring substantially frusto-conical portion 168".

Valve means 164 includes an upper portion having a substantially cylindrical part 210 which joins with a downwardly extending frusto-conical portion 212 which is adapted to seat against the portion 168" of the hole previously described. This upper portion of the valve member includes a depending cylindrical part 214 which is surrounded by a compression coil spring 216. This coil spring rests upon a plug member 220 which is threaded within a suitable hole provided in manifold 160 and includes an upwardly extending portion 222 fitting within the lower part of the spring.

Figure 18:
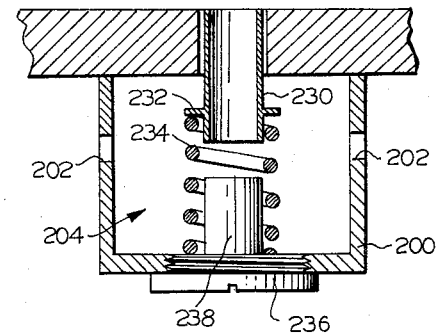
FIGURE 18 is an enlarged view of another form of valve mechanism shown in FIGURE 15.

Referring now to FIGURE 18, the details of construction of one of the valve means 204 is illustrated. A generally cylindrical tubular upper portion 230 of the valve is slidably disposed within a suitable hole provided in the fixed wall 120. A collar 232 extends about the outer periphery of the lower part of portion 230 of the valve and is engaged by the upper end of a compression spring 230, the lower end of which rests upon a plug 236 threaded within a suitable hole provided within the manifold 200. A portion 238 of plug member 236 extends upwardly within the spring.

In operation of the form of the invention illustrated in FIGURES 15-18 inclusive, a load resting on the movable floor 122 will cause the floor to be disposed into the position shown in FIGURE 15. In this position, the valves 164 and 166 are urged downwardly into the open position illustrated, and valve 204 is sealed with respect to the undersurface of movable floor 222 since the spring 234 will urge the tubular portion 230 of this valve upwardly into engagement with the undersurface of the movable floor.

When it is desired to discharge the load supported by the movable floor, fluid under pressure is introduced into the manifolds 160 and 162. This fluid will lift the movable floor 122 upwardly away from the fixed floor 120. Fluid under pressure will then flow through the recesses 146 and 156, through holes 144 and 154, thence through channels 142 and 152 and through holes 140 and 150 into the notches 134 and 136 for urging the gaskets 130 and 132 downwardly against the upper surface of the movable floor to provide a substantially fluid-tight seal thereat.

Since the movable floor is then supported upon a fluid cushion, the frictional forces are sufficiently reduced so that the load will cause the upper portion of the movable floor to move rearwardly as the movable floor is inclined with respect to horizontal. The movable floor 122 will move in a counterclockwise direction as seen in FIGURE 16, and the load will be discharged over the rear roller means 174.

As the load is removed from the movable floor, the upper portion thereof will tend to rise under the influence of the fluid under pressure acting on the undersurface thereof. As the movable floor rises, it is apparent that the valves 164 and 166 will close when the portions 212 of each of these valves seats against the portion 168" of an associated hole in the fixed floor. Accordingly, fluid under pressure will no longer be transmitted to the space between the fixed floor and the movable floor when the valve means 164 and 166 are closed.

If the upper portion of the movable floor should continue to rise, the collar 232 will limit upward movement of tubular portion 230 of the valves 204 so that these tubular portions 230 will no longer be sealed with respect to the undersurface of the movable floor. Accordingly, fluid under pressure will then be vented to atmosphere, preventing the movable floor from billowing upwardly to an undesired extent and pulling out from under the gasket members.

The present invention employs a fluid-slide unloading system wherein fluid pressure is introduced between a fixed floor and a movable floor to enable unloading of the vehicle. The fluid preferably employed is air under pressure, but it should be understood that various other forms of fluid may also be employed according to the present invention. For example, a thin film of oil, water or kerosene and the like may be employed for supporting the movable floor above the fixed floor and to reduce the frictional forces therebetween so that a load can be readily unloaded by movement of the movable floor.

Roller devices have been illustrated in FIGURE 8 as providing a means for supporting the movable floor, and it should be understood that roller devices or Teflon surfaces with or without the addition of fluid under pressure may be employed for supporting the movable floor for movement with respect to the fixed floor.

The rate of unloading may be controlled by connecting the movable floor with a brake or small powered motor to allow uniform spreading from dump trailers without the need for spreader boxes and to minimize the possibility of upsetting the trailer.

Thus it will be appreciated that whereas only preferred forms of the invention have been illustrated and described in detail herein, various changes may be made therein without departing from the spirit of the invention.

What is claimed is:

1. A dump vehicle body having a front end and back end which comprises:
    (a) a front wall and two side walls,
    (b) a bottom frame beneath said front and side walls for supporting said walls in an upright position, (c) a fixed floor disposed on top of said bottom frame and located within the lower perimeter of said front and side walls,
(d) a movable floor disposed immediately above and parallel to said fixed floor and being at least substantially coextensive therewith,
(e) means for introducing fluid between said fixed floor and said movable floor,
(f) sealing means associated with the perimeter of said movable floor which is adapted to inhibit the escape of fluid that is introduced between said fixed floor and said movable floor,
(g) means for allowing movement of said movable floor rearwardly on said dump vehicle body, and then around and under said fixed floor.

2. A dump vehicle body as set forth in claim 1 wherein said means for introducing fluid comprises: a compressed air tank affixed to said bottom frame and an air pipe connecting said tank with said space between said floors through which air flows as it is pumped from the tank into the space between the floors.

3. A dump vehicle body as set forth in claim 1 wherein said movable floor comprises a flexible floor arrangement employing strips of metal approximately 6 to 12″ in width, said strips lying in a plane perpendicular to said longer side of vehicle body and a flexible airproof binding material for affixing the strips to one another.

4. A dump vehicle body as set forth in claim 1 wherein the front end is disposed higher than the back end.

5. A dump vehicle body as set forth in claim 4 wherein the front end is disposed less than 3 feet higher than the back end.

6. A dump vehicle body as set forth in claim 1 wherein said movable floor is a perforated air mat.

7. A dump vehicle body as set forth in claim 1 wherein said movable floor means includes:
(a) an air mat having top, bottom and side surfaces;
(b) said bottom surface of said air mat having a plurality of uniformly distributed evenly spaced holes therein;
(c) said air mat lying above and coextensive with said fixed floor;
(d) whereby said air mat when inflated allows air to escape slowly from the holes in the bottom surface thereof, thereby providing an air cushion which reduces the friction and allows the load itself to provide sufficient force to move the air mat towards the rear of the vehicle, and
(e) takeup means upon which said air mat is rolled as it moves past the rear of the vehicle and the air rushes out of the holes in the bottom surface of the air mat.

8. A dump vehicle body as set forth in claim 7 wherein said air mat is made of a heavy nylon material.

9. A dump vehicle as set forth in claim 7 wherein said takeup means includes a pair of pinch rollers through which the air mat passes as the air rushes out of the holes in the bottom surface thereof, and a reel upon which said air mat is wound as it passes through said pinch rollers.

10. In a dump vehicle having
(a) a vehicle body which has a front and rear thereof with sloping side and front walls,
(b) a bottom frame disposed adjacent said side and front walls of said body and extending the full length of the vehicle body,
(c) said bottom frame being disposed higher at the front but no more than one foot higher than at the rear thereof for every 15 feet of vehicle length,
(d) a fixed floor and a movable floor associated with said body disposed on top of said bottom frame and coextensive therewith,
(e) the improvement which comprises a fluid-slide unloading system for dumping a load from said vehicle comprising fluid-cushioning means cooperating with said movable floor for moving the load to the rear of said vehicle body on a cushion of fluid.

11. In a dump vehicle having:
(a) a vehicle body which has a front and a rear thereof with sloping side and front walls,
(b) a bottom frame disposed adjacent said side and front walls of said body and extending the full length of the vehicle body,
(c) said bottom frame being disposed higher at the front but no more than 1 foot higher at the front than at the rear thereof, for every 15 feet of vehicle length,
(d) a fixed floor disposed on top of said bottom frame and coextensive therewith,
(e) the improvement which comprises a fluid-slide unloading system for dumping the load from said vehicle comprising:
 (1) movable floor means disposed above, having a space between and coextensive with said fixed floor,
 (2) said means provided for carrying a load thereon, and cooperating with said fixed floor to provide a substantially fluid-tight space therebetween,
(f) said movable floor means being displaced when fluid is pumped into said fluid-tight space by the force exerted by said fluid which is sufficient to overcome any opposite frictional forces so that the load is dumped by gravity from the vehicle body.

12. In dump vehicle having:
(a) a vehicle body which has a front and a rear thereof with sloping sides and front walls,
(b) a bottom frame disposed adjacent said side and front walls of said body and extending the full length of the vehicle body,
(c) said bottom frame being disposed higher at the front but no more than 1 foot higher at the front than at the rear thereof for every 15 feet of vehicle length,
(d) a fixed floor disposed on top of said bottom frame coextensive therewith,
(e) the improvement which comprises a fluid-slide unloading system for dumping a load from said vehicle comprising:
 (1) movable floor means disposed above, having a space between, and coextensive with said fixed floor,
 (2) said means provided for carrying a load thereon and cooperating with said fixed floor to provide a substantially fluid-tight space between,
 (3) means affixed to said bottom frame for pumping fluid between said fixed floor and said movable floor means,
 (4) said movable floor means being displaced when the fluid is pumped into said fluid-tight space by the force exerted by said fluid which is sufficient to overcome any opposing frictional drag so that the load is dumped by gravity from the vehicle body.

13. A dump vehicle which comprises:
(a) a vehicle body having sloping side and front walls,
(b) said side walls being of greater length than said front wall,
(c) said body having front and rear portions thereof,
(d) a bottom frame disposed adjacent said side and front walls of said body, extending the full length of said vehicle body and being disposed higher at the front but no more than 1 foot higher at the front portion than at the rear portion thereof for every 15 feet of vehicle length,
(e) a fixed floor disposed on top of said bottom frame and coextensive therewith,
(f) a movable floor disposed above, having a space between, and coextensive with said fixed floor, (g) said movable floor being provided to carry a load thereon,
(h) means affixed to said bottom frame for pumping fluid between said fixed floor and said movable floor,
(i) sealing means provided between said fixed and movable floors for preventing the escape of fluid between said floors when the fluid is pumped into said space between said floors, and
(j) means for allowing said movable floor to be displaced during a dumping operation, whereby when the load is placed in said vehicle body resting on said movable floor and fluid is pumped into said space between said fixed and movable floors forming a cushion of fluid therebetween, the load will exert such force as to overcome the frictional drag and the movable floor will be displaced, thereby dumping the load.

14. A dump vehicle which comprises:
(a) a vehicle body having front and side walls,
(b) said body including a fixed floor,
(c) a movable floor mounted for movement with respect to said fixed floor and including a portion disposed above said fixed floor for receiving a load, the front portion of said movable floor being disposed higher than the rear portion of said movable floor, said movable floor comprising a continuous means formed of flexible material, and
(d) means for introducing fluid between said fixed floor and the portion of the movable floor disposed thereabove for raising said last mentioned portion of the movable floor away from said fixed floor and to reduce frictional drag so that a load supported by said fixed floor is dumped from said vehicle body.

15. A dump vehicle as set forth in claim 14 wherein said movable floor comprises an endless belt means passing both over and under said fixed floor and around opposite end edge portions of said fixed floor.

16. A dump vehicle as set forth in claim 14 which includes gasket means guided by said vehicle body and engageable with portions of said movable floor for providing a substantially fluid-tight seal therewith.

17. A dump vehicle as set forth in claim 16 which includes means for applying fluid pressure to said sealing means for urging said sealing means into engagement with said movable floor.

18. A dump vehicle as set forth in claim 14 which includes the introduction of fluid into a space between said fixed floor and said movable floor.

19. A dump vehicle as set forth in claim 18 including relief valve means engageable with said movable floor and operable upon predetermined movement of said movable floor to vent the space between said fixed floor and said movable floor to limit movement of said movable floor in a direction away from said fixed floor.

References Cited
UNITED STATES PATENTS

| | | | |
|---|---|---|---|
| 756,600 | 4/1904 | Dodge | 305—34 |
| 1,927,653 | 9/1933 | Wehr | 298—1 |
| 2,400,661 | 5/1946 | Strauensee | 214—83.34 X |
| 2,538,972 | 1/1951 | Magnani | 302—29 |
| 2,918,183 | 12/1959 | Petersen | 302—29 |
| 3,074,764 | 1/1963 | Bertelsen | 305—34 X |
| 3,240,370 | 3/1966 | Sadler | 214—83.34 X |
| 3,025,982 | 3/1962 | Quint | 214—83.36 |

RICHARD J. JOHNSON, Primary Examiner

U.S. Cl. X.R.

193—4; 214—83.34, 83.36; 298—1; 302—29